United States Patent [19]

Maehara

[11] 4,124,105
[45] Nov. 7, 1978

[54] AUDIBLE ALARM SOUNDING TYPE PAD CLIP DEVICE FOR DISC BRAKE

[75] Inventor: Toshifumi Maehara, Gyoda, Japan

[73] Assignee: Akebono Brake Industry Company, Ltd., Tokyo, Japan

[21] Appl. No.: 810,419

[22] Filed: Jun. 27, 1977

[51] Int. Cl.² .............................................. F16D 66/02
[52] U.S. Cl. ................................. 188/1 A; 116/114 Q
[58] Field of Search .......................... 188/73.5, 1 A; 116/114 Q

[56] References Cited

U.S. PATENT DOCUMENTS

| 3,972,391 | 8/1976 | Penn | 188/1 A |
| 4,037,689 | 7/1977 | Maehara | 188/1 A |

*Primary Examiner*—George E. A. Halvosa

*Attorney, Agent, or Firm*—Armstrong, Nikaido, Marmelstein & Kubovcik

[57] ABSTRACT

A pad clip for disc brakes wherein one side portion of the pad clip is attached to the backing plate of a friction pad and another side portion of the pad clip has an end projecting to an allowable limit of wear of the lining of a friction pad. The pad clip produces an audible warning sound when the projecting end portion of the pad clip is resiliently pressed against the disc during braking after the lining of the friction pad has worn to the allowable limit. The projecting side portion of the pad clip resists movement in a direction away from the plane of the disc so as to prevent failure of the warning sound activation while still providing sufficient resilience to bias the disc.

4 Claims, 6 Drawing Figures

AUDIBLE ALARM SOUNDING TYPE PAD CLIP DEVICE FOR DISC BRAKE

BACKGROUND OF THE INVENTION

1. Field of the Invention

The present invention relates to an improvement in a pad clip device for a disc brake as disclosed by the present applicant in U.S. Pat. No. 4,037,689, assigned to the assignee of the present invention. The pad clip device is disposed between a friction pad backing plate and a backing plate support which slidably guides the friction pads. The pad clip eliminates rattling between the backing plate and the support and is also utilized as a means for producing an audible sound during braking when the lining of the friction pad reaches a predetermined allowable limit of wear. The pad clip of this invention is provided, particularly on the projecting side portion thereof, with a means for limiting the projecting side portion of the pad clip from moving in a direction away from the plane of the disc so as to prevent failure of the warning sound system, while still providing the pad clip, particularly the projecting side portion thereof, with a sufficient resilience to press the disc.

2. Description of the Prior Art

In a disc brake, in general, a support 2 is secured to a stationary part of a vehicle with bolts screwed into holes 1, as illustrated in FIG. 1. Protrudent portions 4a of a backing plate 4b of each friction pad 4 are loosely fitted in right and left guide grooves 3 provided in the support which absorbs the braking force generated on each friction pad. The backing plates 4b are freely slidable in a direction transverse to the plane of a brake disc 5. Two friction pads are disposed on each side of the disc 5 which rotates in the direction indicated by an arrow in FIG. 1. The brake is applied to the wheel through the disc by pressing the friction pads against the disc by means of an acting portion and a reacting portion of a caliper 8.

Since the backing plate 4b of the friction pad 4 loosely engages with the guide grooves 3 of the support through the protrudent portions 4a, the backing plate 4b tends to rattle and produce noises when the wheels of the vehicle vibrate or when a shock results from braking. To prevent such rattling, it has been proposed to insert a resilient metal pad clip 6 between the guide groove 3 and the protrudent portion 4a. With such an arrangement, the rattling of the backing plate of the friction pad 4 can be prevented by the resilience of the pad clip 6.

Applicant's previous invention was directed to producing an audible warning sound by utilization of the pad clip device when the lining of the brake friction pad had worn to a maximum allowable limit. The present invention relates to a pad clip device which provides a means thereon, particularly midway on the projecting side portion of the pad clip to limit a movement in the direction away from the plane of the disc in order to prevent a failure in the warning sound system owing to the projecting side portion of the pad clip being pushed away from the disc by a small protuberance produced by rust, etc. on the surface of the disc or the projecting end, and thus ensures a stable and satisfactory function of the pad clip for producing the warning sound.

As illustrated in FIGS. 2 through 4, the pad clip device 6 of the previous invention takes the form of a long U-shaped arrangement formed from a resilient material, such as metal. A base portion 6a is bent sideways at an angle of 90° to form one side portion 6b and a projecting side portion 6c. The one side portion 6b of the pad clip 6 is provided with a hole. A protrusion 4c in the form of a short stud protrudes from the backing plate 4b of the friction pad 4. The protrusion 4c is inserted through the hole 6e' in the one side portion 6b. After insertion, the protrusion 4c is expanded in the shape of a rivet head to secure the pad clip 6 to the backing plate 4b. The projecting side portion 6c of the pad clip 6 is extended to have the end 6d coincide with the thickness 1 of the lining 7 of the friction pad when the pad has worn to the predetermined allowable limit, and also acts to press the support 2 so that the friction pad 4 is biased in a direction of rotation of a disc 5 (in the direction of the arrow in FIG. 1). With the pad clip 6 arrangement described above, the rattling and noise between the support 2 and the backing plate 4b of the friction pad 4 is prevented by the resilient contact of the projecting end portion of the pad clip 6 with the support 2. In addition, the end 6d of the projecting end portion 6c comes into contact with the disc 5 to produce a warning sound when the lining 7 of the friction pad wears out as shown in FIG. 4.

The arrangement of the pad clip device in the previous patent provides a vibration of the side portion 6c with a sufficient amplitude, but does not provide a sufficiently strong resilience for pressing the end 6d of the pad clip 6 against the disc 5, which results in the end 6d of the pad clip 6 failing to come in contact with the disc 5 even when the lining reaches the limit of wear if there is a small protuberance produced by rust, etc. on the surface of the disc or the end portion 6d. Therefore, the pad clip of this arrangement is unstable in producing a warning sound.

SUMMARY OF THE INVENTION

The present invention is directed to providing the projecting side portion 6c, of the pad clip 6 with a sufficiently strong resilience for pressing the end 6d of the side portion 6c to the disc 5 as well as a sufficient degree of freedom for vibration as before being maintained in order to ensure an effectively stable action of the pad clip 6. Thus, the purpose of the invention is to obtain a brake pad clip having a more reliable action in producing an audible warning sound.

Further details and advantages of this invention will become apparent from the following description of preferred embodiments with the accompanying drawings.

DETAILED DESCRIPTION OF THE PREFERRED EMBODIMENTS

Figure 4:
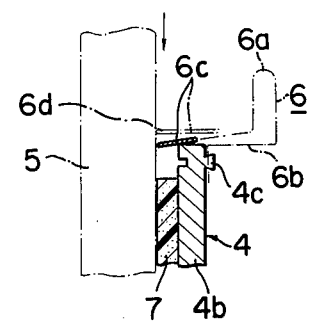
FIG. 4 schematically illustrates the oscillating condition of projecting side portion 6c of the pad clip.
Figure 5:
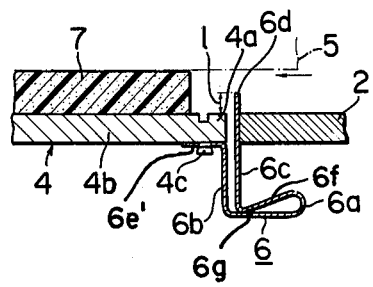
FIG. 5 is an enlarged sectional view taken along II—II of FIG. 1 showing a first embodiment of the present invention.

As illustrated in FIG. 5 of the first embodiment, a base portion 6a of a long U-shaped pad clip 6 is bent at substantially a right angle in a longitudinal direction of a friction pad 4 in such a manner as to touch a respective leg portion 6g of the one portion 6b and a respective leg portion 6f of the projecting side portion 6c to each other. The arrangement of the side portions 6b and 6c in this way provides an exceedingly strong resilience for pressing the end 6d of the projecting side portion 6c against the disc 5 when the lining 7 of the friction pad 4 has reached the predetermined allowable limit of wear as compared with the case of FIGS. 2-4 and, in turn, brings the end 6d of the projecting side portion 6c into contact with the disc 5 firmly even when there is a protuberance such as rust sticking to the end 6d of the projecting side portion 6c or to the disc, so that the side portion 6c vibrates on the fulcrum of the base portion 6a. The projecting side portion 6c of this embodiment vibrates with a sufficiently strong amplitude and stably produces a warning sound, the degree of freedom for vibration being the same as that of the example illustrated in FIGS. 2-4.

Figure 1:
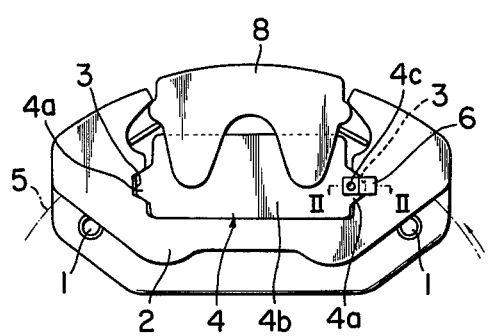
FIG. 1 is a view of a pad clip and disc brake arrangement.
Figure 2:
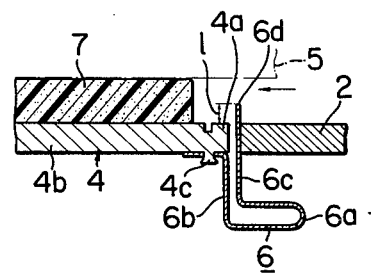
FIG. 2 is an enlarged sectional view taken along II—II of FIG. 1 showing a prior art device.
Figure 3:
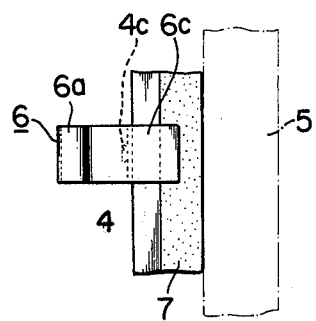
FIG. 3 is a right side view of FIG. 2.
Figure 6:
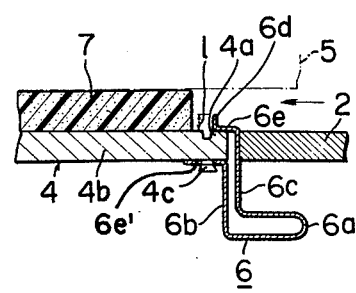
FIG. 6 is an enlarged sectional view taken along II—II of FIG. 1 showing a second embodiment of the present invention.

As illustrated in FIG. 6, a second embodiment has a base portion 6a of the pad clip 6 formed in a long U-shape in such a manner as to keep respective base portions of the one side portion 6b and the projecting side portion 6c apart from each other as in the example of FIGS. 2-4. The projecting side portion 6c is provided midway with a stepped portion 6e which comes in contact with the surface of the backing plate 4b of the friction pad 4. With such an arrangement, if the brakes are worn to the predetermined allowable limit, the end 6d of the projecting side portion 6c is firmly pressed against the disc 5 by the backing plate 4b through the stepped portion 6e whenever the brakes are applied. Since the stepped portion 6e is able to slide along the inner surface of the backing plate 4b, the projecting side portion 6c vibrates with a sufficiently strong amplitude on the fulcrum of the base portion 6a and stably produces a warning sound in the same manner as the embodiment of FIG. 5.

In the embodiments of FIG. 5 and FIG. 6, the end 6d of the projecting side portion 6c is arranged to extend to a point coinciding with the thickness 1 of the lining 7 of the friction pad 4 which represents the allowable limit of wear of the lining.

As described in the foregoing specification, the audible sound type pad clip device of the present invention not only eliminates rattling between the support and the backing plate 4b of the friction pad 4 but also produces a loud warning sound with stability and effectiveness when the lining of the friction pad has worn away to a predetermined allowable limit. The invented pad clip device is currently giving satisfactory results in practical use.

What is claimed is:

1. In a disc brake system having a brake disc, a support structure and at least one brake pad assembly mounted for reciprocal movement on said support structure; a dual function resilient pad clip, said pad clip having two side portions; a first side portion attached to said brake pad assembly and a projecting side portion engaging said support structure, such that said pad clip prevents rattling of said brake pad; said projecting side portion having an end extending to a point coinciding with an allowable limit of wear of said brake pad assembly such that when said brake pads reach said allowable limit of wear said end contacts said brake disc thereby giving an audible indication of brake wear, the improvement comprising resisting means for substantially preventing relative movement between said side portions in a direction away from the plane of the disc and thereby resisting movement of said projecting side portion in a direction away from the plane of said brake disc.

2. A pad clip as claimed in claim 1 wherein said resisting means comprises a U-shaped base portion interconnecting said side portions; said U-shaped base portion having two leg portions wherein one of said leg portions is bent deeply in such manner as to rest against the other of said leg portions, thereby preventing movement of said projecting side portion relative to said first side portion in said direction away from the plane of said brake disc.

3. A pad clip as claimed in claim 1, wherein said resisting means comprises a stepped portion on said projecting side portion, a portion of said stepped portion engaging said brake pad assembly, thereby preventing movement of said projecting side portion in said direction away from the plane of said brake disc.

4. A pad clip as claimed in claim 1, wherein said pad clip further comprises a base portion having a long U-shape, said U-shape being angled perpendicular to said projecting side portion in a direction parallel to said brake pad assembly.

* * * * *